(12) United States Patent
Yin

(10) Patent No.: US 11,137,575 B2
(45) Date of Patent: Oct. 5, 2021

(54) CAMERA LENS PROCESSING METHOD, CAMERA LENS, CAMERA ASSEMBLY AND ELECTRONIC DEVICE

(71) Applicant: BEIJING XIAOMI MOBILE SOFTWARE CO., LTD., Beijing (CN)

(72) Inventor: Zhidong Yin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/676,426

(22) Filed: Nov. 6, 2019

(65) Prior Publication Data

US 2020/0150388 A1    May 14, 2020

(30) Foreign Application Priority Data

Nov. 9, 2018    (CN) .......................... 201811331003.8

(51) Int. Cl.
  *G02B 13/00*    (2006.01)
  *H04N 5/225*    (2006.01)
  *G02B 7/02*    (2021.01)

(52) U.S. Cl.
  CPC ........... *G02B 13/004* (2013.01); *G02B 7/021* (2013.01); *H04N 5/2254* (2013.01); *G02B 7/025* (2013.01)

(58) Field of Classification Search
  CPC ...... G02B 13/004; G02B 7/021; G02B 7/025; G02B 13/001; H04N 5/2254
  See application file for complete search history.

(56) References Cited

U.S. PATENT DOCUMENTS

| 2011/0063739 | A1 | 3/2011 | Hirata et al. |
| 2015/0293330 | A1* | 10/2015 | Gutierrez ............... G03B 43/00 359/811 |
| 2015/0373303 | A1* | 12/2015 | Visosky ............... H04N 5/2251 348/14.05 |
| 2019/0137724 | A1* | 5/2019 | Kim ......................... G02B 5/23 |

FOREIGN PATENT DOCUMENTS

| CN | 207528984 U | 6/2018 |
| CN | 108712597 A | 10/2018 |
| EP | 3594730 A1 | 1/2020 |

OTHER PUBLICATIONS

Extended European Search Report issued in EP Application No. 19208015.8, dated Jun. 16, 2020, (7p).
First Office Action to Chinese Application No. 201811331003.8, dated Jun. 3, 2021 with English translation, (12p).

* cited by examiner

*Primary Examiner* — Yogesh K Aggarwal
(74) *Attorney, Agent, or Firm* — Arch & Lake LLP

(57) ABSTRACT

The present disclosure relates to a camera lens processing method, a camera lens, a camera assembly and an electronic device. The camera lens includes a lens barrel. The processing method includes: a first lens group and a second lens group are obtained, wherein the second lens group is configured to form a light emitting surface of the camera lens, and the first lens group is configured to form a light incidence surface of the camera lens and includes a plurality of interconnected lenses; the second lens group is mounted into the lens barrel; and the first lens group is mounted into the lens barrel and made to partially protrude from an end surface of the lens barrel to obtain the camera lens.

17 Claims, 4 Drawing Sheets

CAMERA LENS PROCESSING METHOD, CAMERA LENS, CAMERA ASSEMBLY AND ELECTRONIC DEVICE

CROSS REFERENCE TO RELATED APPLICATIONS

This application claims priority to Chinese Patent Application No. 2018113310038 filed on Nov. 9, 2018, the entire content of which is incorporated herein by reference.

TECHNICAL FIELD

The present disclosure relates to the field of terminal device technology, and in particular to a camera lens processing method, a camera lens, a camera assembly and an electronic device.

BACKGROUND

At present, with super-rapid development of various technologies in the terminal device field, users have increasing requirements for different functions and aesthetics of electronic devices. For example, the user desires to still take self-photographing or video with a front camera in a case that a front display region of the electronic device is substantially maximized.

SUMMARY

To solve deficiencies in the related art, the present disclosure provides a camera lens processing method, a camera lens, a camera assembly and an electronic device.

According to a first aspect of examples of the present disclosure, there is provided a method of processing camera lens, wherein the camera lens includes a lens barrel. The method includes: obtaining a first lens group and a second lens group, wherein the second lens group is configured to form a light emitting surface of the camera lens, and the first lens group is configured to form a light incidence surface of the camera lens and includes a plurality of interconnected lenses; mounting the second lens group into the lens barrel; and mounting the first lens group into the lens barrel and making the first lens group to partially protrude from an end surface of the lens barrel to obtain the camera lens.

According to a second aspect of examples of the present disclosure, there is provided a camera lens, including: a lens barrel; a first lens group configured to form a light incidence surface of the camera lens and comprising a plurality of interconnected lenses, wherein at least part of the first lens group is protruded from an end surface of the lens barrel; and a second lens group configured to form a light emitting surface of the camera lens.

According to a third aspect of examples of the present disclosure, there is provided a camera assembly, including the camera lens as described above.

According to a fourth aspect of examples of the present disclosure, there is provided an electronic device, including: a screen assembly; and the camera assembly as described above.

It is to be understood that the above general descriptions and the below detailed descriptions are merely exemplary and explanatory, and are not intended to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
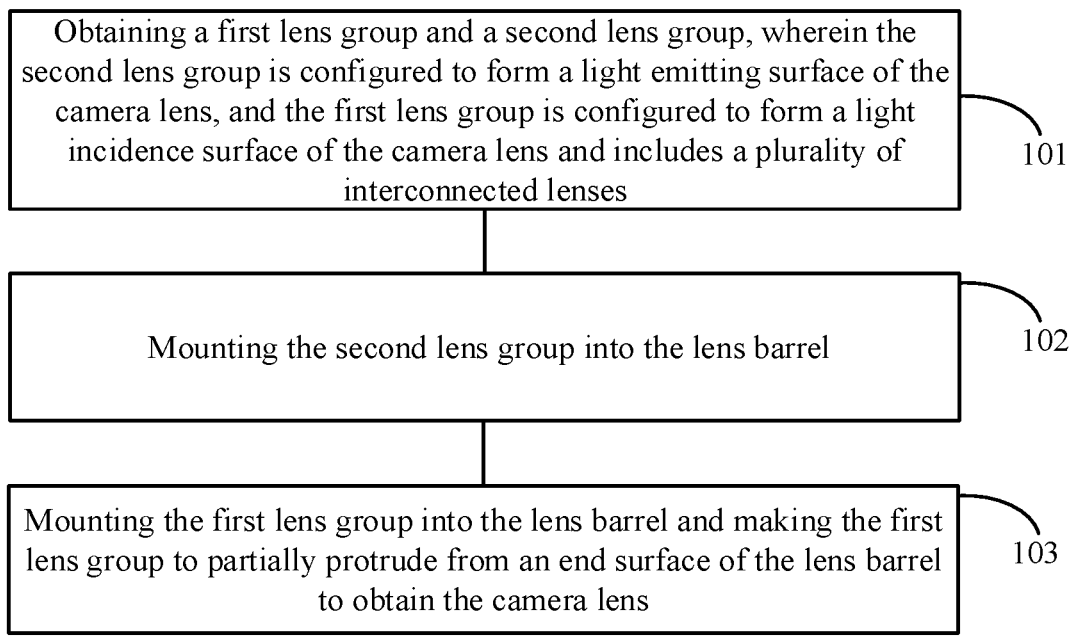
FIG. 1 is a flowchart illustrating a camera lens processing method according to an example of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

The present disclosure provides a camera lens processing method. The camera lens includes a lens barrel. FIG. 1 is a flowchart illustrating a camera lens processing method according to an example of the present disclosure. As shown in FIG. 1. the processing method may include the following steps.

At step 101, a first lens group and a second lens group are obtained, where the second lens group is configured to form a light emitting surface of the camera lens, and the first lens group is configured to form a light incidence surface of the camera lens and includes a plurality of interconnected lenses.

In some examples, the lenses included in the first lens group and the second lens group may be one or more of a resin lens, a polycarbonate lens and a glass lens, which is not limited herein. The first lens group may include a plurality of interconnected lenses. Further, the first lens group may be configured to form the light incidence surface of the camera lens, and the second lens group may be configured to form the light emitting surface of the camera lens. In other words, in the technical solution of the present disclosure, external light is incident from the first lens group, and then emitted from the first lens group and then input into the second lens group. Finally, the external light is transmitted into an image sensor to obtain image information.

At step 102, the second lens group is mounted into the lens barrel.

At step 103, the first lens group is mounted into the lens barrel and made to partially protrude from an end surface of the lens barrel to obtain the camera lens.

In some examples, the lens group included in the camera lens may be mounted along an incidence direction of external light. Specifically, the second lens group is mounted into the lens barrel, and then the first lens group is mounted into the lens barrel and made to partially protrude from an end surface of the lens barrel. In this way, the camera lens may be obtained.

In some examples, the first lens group may include two or more lenses. For example, the first lens group may include a first lens and a second lens. For another example, the first lens group may include a first lens and at least one second lens. The first lens is configured to form the light incidence surface of the camera lens, and protrude from the end surface of the lens barrel. At least one lens in the first lens group can be packaged with the lens barrel to realize relative fixing between the first lens group and the lens barrel.

The first lens group including the first lens and the second lens is still taken as an example. After the first lens group is mounted into the lens barrel, the second lens and the lens barrel may be packaged. Since the first lens and the second lens are fixedly connected, the first lens is fixed relative to the lens barrel. Further, because it is not required to connect the first lens with the lens barrel, the first lens is entirely protruded out of the end surface of the lens barrel, facilitating reducing a size of the camera lens.

Optionally, in some other examples, an end of the first lens close to the second lens may be packaged with the lens barrel as well, so that an end of the first lens away from the second lens protrudes from the lens barrel, helping to reduce the size of the camera lens. Certainly, in some other examples, the first lens and the second lens may also be both packaged with the lens barrel, which is not described herein.

The first lens group may be obtained by interconnecting the lenses in a glue dispensing manner. For example, a recessing portion may be formed on one of the lenses, and then, another lens is pressed into the recessing portion to realize tight fitting. Optionally, two adjacent lenses may also be connected by dispensing glue. Optionally, in some other examples, the interconnected lenses may also be tightly fitted and fixed by dispensing glue, which is not limited herein.

In some examples, the second lens group may include a single lens or a plurality of lenses. When the second lens group includes a single lens, the single lens is configured to form the light emitting surface of the camera lens. When the second lens group includes a plurality of lenses, for example, the second lens group may include at least one third lens and a fourth lens for forming the light emitting surface of the camera lens, and the at least one third lens is located between the fourth lens and the first lens group. Based on this, the fourth lens may be firstly mounted into the lens barrel, then, the at least one third lens is sequentially mounted into the lens barrel, and then, the first lens group is mounted into the lens barrel.

It is to be noted that the second lens group may be mounted into the lens barrel after the first lens group is obtained by connecting a plurality of lenses. Optionally, the second lens group may also be firstly mounted into the lens barrel, and then, the first lens group is obtained by connecting a plurality of lenses and then the first lens group is mounted into the lens barrel, which is not limited herein.

In the above different examples, light extinction treatment may also be performed for at least one lens included in the first lens group or the second lens group, or light extinction treatment may also be performed for at least one lens included in the first lens group and the second lens group, so as to prevent the lens from generating flares during use.

For example, a light shielding layer may be formed by coating non-transparent material on one region of one lens included in the camera lens, and surrounding stray light and scattered light are blocked by the light shielding layer. The non-transparent material may include ink, paint, or any other material. Certainly, a corresponding light shielding layer may also be formed by coating ink on a region corresponding to a plurality of lenses or each lens included in the camera lens, which is not limited herein.

It can be known from the above examples of the present disclosure that the second lens group can be assembled into the lens barrel prior to the first lens group, so that the bearing structure may be disposed at an end of the lens barrel away from the light incidence surface to bear the second lens group. In this way, it is avoided that the bearing structure is disposed at an end of the lens barrel close to the light incidence surface, and thus the volume of an end of the lens barrel close to the light incidence surface is reduced. Further, since the lenses included in the first lens group are directly and fixedly connected, a part of the first lens group can protrudes from the end surface of the lens barrel to reduce the volume of the lens barrel and facilitate the miniaturization of the camera lens. Especially, when the camera lens is used as a front camera of the electronic device, a size of an opening for inserting the camera lens on a screen component of the electronic device may be reduced, thereby facilitating increasing a screen-to-body ratio.

Figure 2:
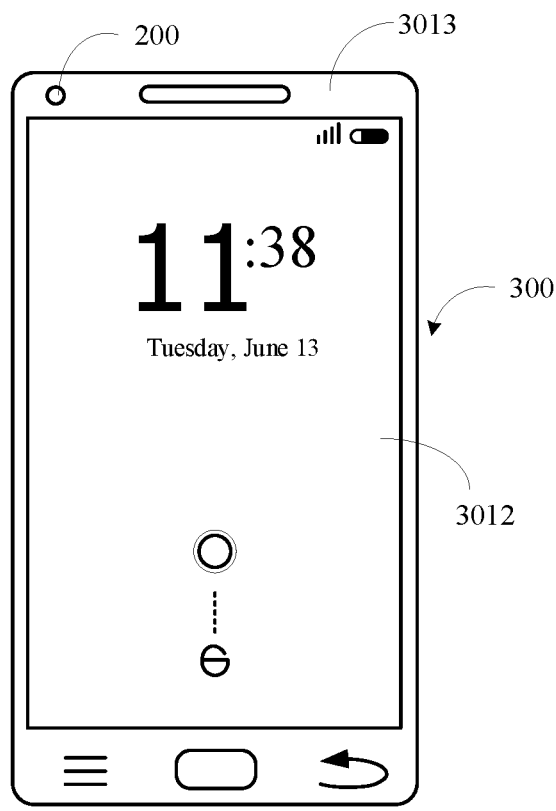
FIG. 2 is a schematic diagram illustrating a structure of an electronic device according to an example of the present disclosure.
Figure 3:
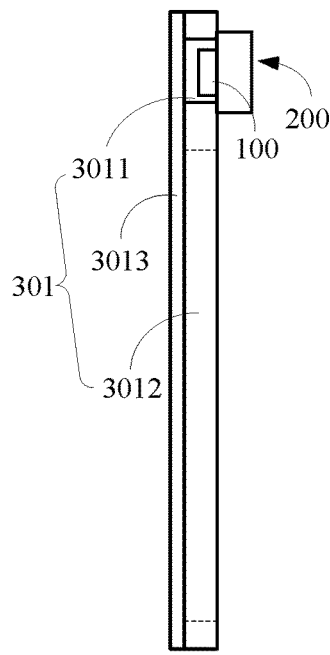
FIG. 3 is a schematic diagram illustrating a cross section of an electronic device according to an example of the present disclosure.

As shown in FIG. 2 and FIG. 3, the technical solution of the present disclosure are described in detail below with a camera lens 100 as an example. The camera lens 100 may be applied to a camera assembly 200, and the camera assembly 200 may be further taken as a front camera of an electronic device 300. The electronic device 300 may include a mobile device, such as a mobile phone, a tablet computer and an e-reader, which is not limited herein.

The technical solution of the present disclosure will be described below with the camera lens 100 including five lenses.

Figure 4:
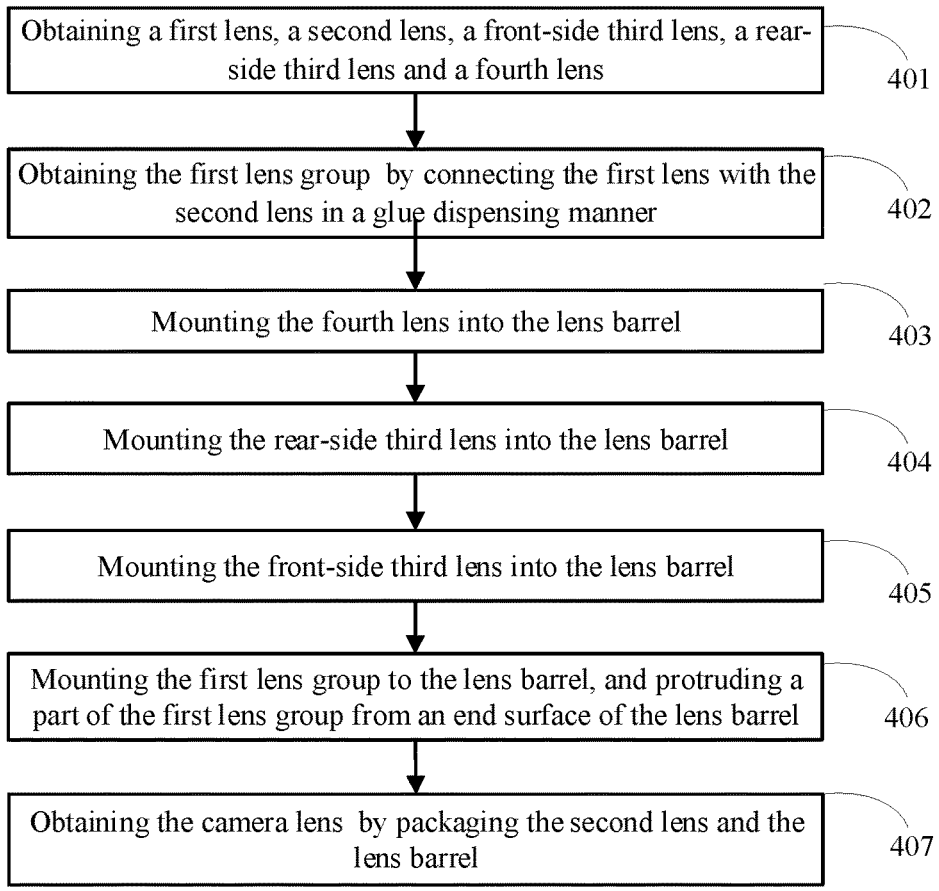
FIG. 4 is a flowchart illustrating a camera lens processing method according to another example of the present disclosure.
Figure 5:
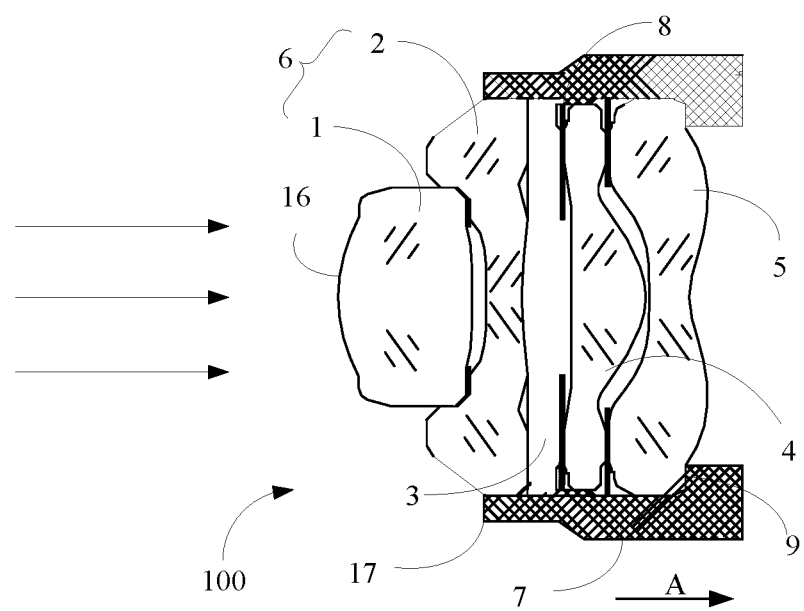
FIG. 5 is a schematic diagram illustrating a structure of a camera lens according to an example of the present disclosure.

As shown in FIG. 4 and FIG. 5, a processing method of the camera lens 100 may include the following steps.

At step 401, a first lens 1, a second lens 2, a front third lens 3, a rear third lens 4 and a fourth lens 5 are obtained.

In some examples, it may be assumed that the camera lens 100 includes five lenses, which sequentially are the first lens 1, the second lens 2, the front third lens 3, the rear third lens 4 and the fourth lens 5. The first lens 1 and the second lens 2 are connected to form a first lens group 6, and the front third lens 3, the rear third lens 4 and the fourth lens 5 form a second lens group.

The fourth lens 5 is configured to form a light emitting surface of the camera lens 100, the first lens 1 is configured to form a light incidence surface of the camera lens 100, and distances from the second lens 2, the front third lens 3 and the rear third lens 4 to the light incidence surface increase sequentially. That is, when the camera assembly 200 is taken as the front camera of the electronic device 300, distances from the first lens 1, the second lens 2, the front third lens 3, the rear third lens 4 and the fourth lens 5 to the a display region of the electronic device 300 sequentially increase.

Certainly, descriptions are made herein only with the camera lens 100 including five lenses. In some other examples, the number of lenses included in the camera lens may be less than five or more than five, which is not limited herein.

At step 402, the first lens group 6 is obtained by connecting the first lens 1 with the second lens 2 in a glue dispensing manner.

In some examples, the first lens 1 and the second lens 2 may be connected in a glue bonding manner, so that the first lens 1 is positioned and fixed through the second lens 2. Subsequently, it is avoided that the first lens 1 is fixed through the lens barrel 7, thereby facilitating the miniaturization of the camera lens 100. Certainly, although descriptions are made herein with forming the first lens group 6 by fixedly connecting the first lens 1 with the second lens 2 as an example, the first lens group 6 may also be obtained by interconnecting more than two lenses, which is not limited herein.

At step 403, the fourth lens 5 is mounted into the lens barrel 7.

At step 404, the rear third lens 4 is mounted into the lens barrel 7.

At step 405, the front third lens 3 is mounted into the lens barrel 7.

At step 406, the first lens group 6 is mounted to the lens barrel 7, and a part of the first lens group 6 protrudes from an end surface 17 of the lens barrel 7.

In some examples, all lenses included in the camera lens 100 may be sequentially mounted along an incidence direction of external light. For example, as shown in FIG. 5, the fourth lens 5, the rear third lens 4, the front third lens 3 and the first lens group 6 may be sequentially mounted along a direction shown by an arrow A. An end 16 of the first lens group 6 protrudes from the end surface 17 of the lens barrel 7, thereby facilitating reducing an end of the camera lens 100 close to the first lens group 6. In this way, a spatial volume of the camera lens is reduced, and the screen-to-body ratio of the electronic device 300 is increased.

Since the fourth lens 5, the rear third lens 4, the front third lens 3, the second lens 2 and the first lens 1 are sequentially mounted along the direction shown by the arrow A, i.e., the incidence direction of the external light, a diameter of an end of the lens barrel 7 close to the first lens group 6 may be at least greater than or equal to a diameter of the fourth lens 5. Therefore, if the second lens 2 is packaged with the lens barrel 7, the diameters of the second lens 2, the front third lens 3, the rear third lens 4 and the fourth lens 5 in the present disclosure may be substantially same, and thus a mounting difficulty may be reduced.

In the above examples, the second lens group is assembled into the lens barrel 7 prior to the first lens group 6, so that the bearing structure 9 may be disposed at an end of the lens barrel 7 away from the light incidence surface to bear the second lens group. In this way, it is avoided that the bearing structure 9 is disposed at an end of the lens barrel 7 close to the light incidence surface, and thus the volume of an end of the lens barrel 7 close to the light incidence surface is reduced.

Figure 6:
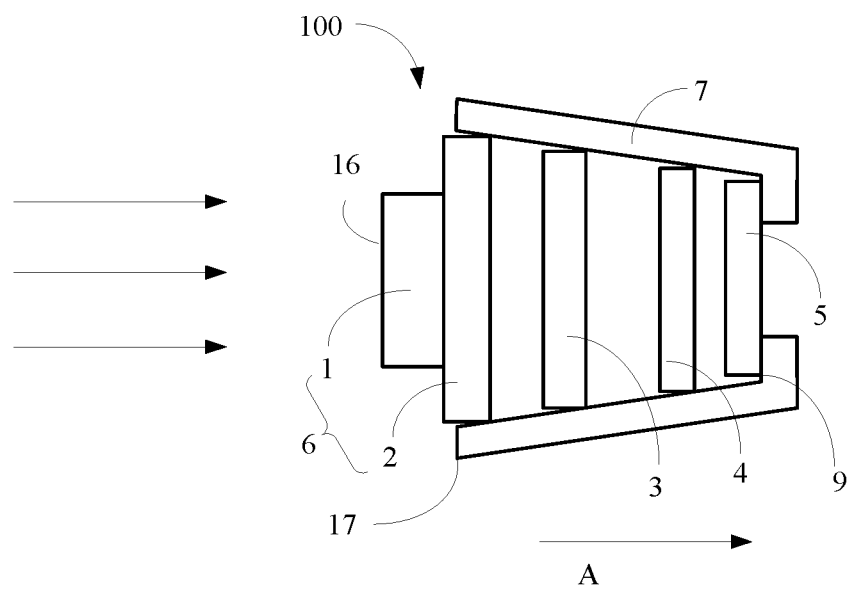
FIG. 6 is a schematic diagram illustrating a structure of a camera lens according to another example of the present disclosure.

In another example, as shown in FIG. 6, it is assumed that the second lens 2 is packaged with the lens barrel 7, the diameters of the second lens 2, the front third lens 3, the rear third lens 4 and the fourth lens 5 may also sequentially decrease. Therefore, it is ensured that during the process of mounting the fourth lens 5 from an end of the lens barrel 7 close to the outside into the lens barrel 7, the volume of an end of the lens barrel 7 away from the outside is reduced. In this way, the volume of the camera lens 100 is reduced, and thus a spatial layout inside the electronic device 300 can be better used.

At step 407, the camera lens 100 is obtained by packaging the second lens 2 and the lens barrel 7.

In some examples, the second lens 2 and the lens barrel 7 may be bonded by glue or other bonding material. However, since the first lens 1 and the second lens 2 are fixed, the first lens 1 is also fixedly disposed relative to the lens barrel 7 without directly generating connection with the lens barrel 7. Thus, the first lens 1 may be completely protruded from the end surface 17 of the lens barrel 7 without disposing a structure for bearing the first lens on the lens barrel 7, thereby facilitating reducing the lens barrel 7 and reducing the volume of the camera lens 100.

Based on the example of FIG. 4, light extinction treatment may also be performed for at least one lens of the plurality of lenses. For example, as shown in FIG. 5, a light shielding layer 8 may be obtained by performing an ink coating process on the lens, and the light shielding layer 8 may be located in an edge region of at least one lens to block stray light and avoid affecting imaging of the camera assembly 200. For example, the light shielding layer 8 may be formed in the edge region of each lens. The light shielding layer 8 may be formed on a surface of the lens used for external light to enter. Optionally, the light shielding layer 8 may also be formed on a surface of the lens used for external light to be emitted. Optionally, the light shielding layer 8 may also be formed on both the incidence surface and the emitting surface of the lens, which is not limited herein. The light shielding layer 8 may be formed through the ink coating process.

Based on the technical solution of the present disclosure, as shown in FIG. 2 and FIG. 3, the camera assembly 200 may be assembled to the electronic device 300. A technical effect that the camera lens 100 of the present disclosure can increase the screen-to-body ratio is described in detail herein with the electronic device 300 being a mobile electronic device as shown in FIG. 2. As shown in FIG. 3, the camera assembly 200 is mounted into the mobile electronic device and taken as a front camera of the mobile device. A user may take self-photographing or a video through the camera assembly 200.

The mobile electronic device may include a screen component 301. As shown in FIG. 3, the screen component 301 may include an opening 3011, and the opening 3011 may be used to accommodate a part of the first lens group 6 protruded from the lens barrel 7. In a traditional technology, an opening is disposed on the lens barrel to allow the lens barrel to wrap the lens. In the present disclosure, the size of the opening 3011 may be reduced due to reduction of a circumferential size of the camera lens 100, thereby increasing a strength of the screen component 301 and the screen-to-body ratio.

In some examples, as illustrated in FIG. 3, the screen component 301 may include a display panel 3012 and a front panel 3013 cooperating with the display panel 3012. The display panel 3012 may be used to display image information. The front panel 3013 may include a shielding region around the display panel 3012 and used to cover a circuit board and relevant electronic elements inside the mobile electronic device. The opening 3011 may be provided in the blocking region of the front panel 3013 to avoid a display region of the display panel 3012. Certainly, in some other examples, the opening 3011 may also be provided on the display panel 3012, which is not limited herein.

Figure 7:
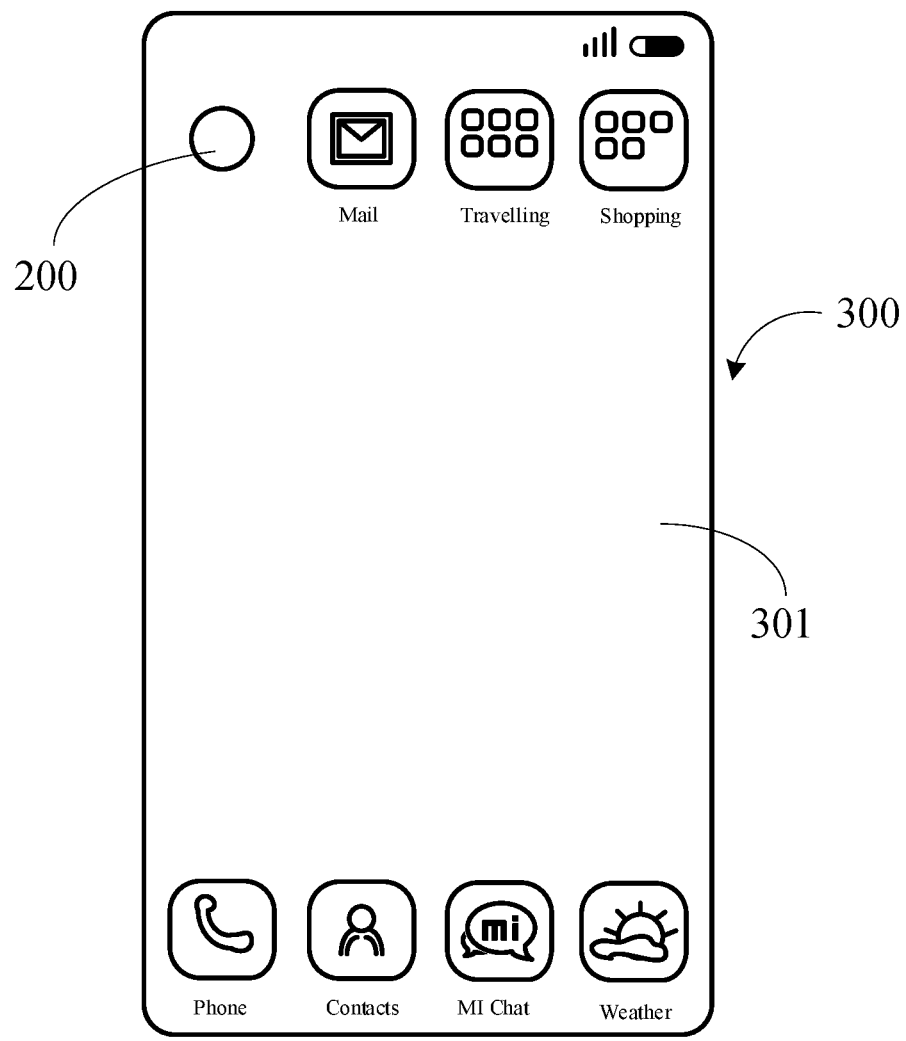
FIG. 7 is a schematic diagram illustrating a structure of an electronic device according to another example of the present disclosure.

In another example, as shown in FIG. 7, an edge of the display region corresponding to the display panel 3012 is substantially matched with an edge of the mobile electronic device, that is, full screen display of the electronic device 300 is substantially achieved. At this time, the opening 3011 may be provided on the display panel 3012. Similarly, it is not required to dispose the opening 3011 at an end of the lens barrel 7 close to the display panel 3012, but to insert the protruding end of the first lens group 6 only, thereby further increasing the screen-to-body ratio of the mobile electronic device.

After considering the specification and practicing the present disclosure, the persons of skill in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of the present disclosure is limited only by the appended claims.

What is claimed is:

1. A method for processing a camera lens, wherein the camera lens comprises a lens barrel, the method comprising:
   obtaining a first lens group and a second lens group, wherein the first lens group is configured to form a light incidence surface of the camera lens and comprises a plurality of interconnected lenses; and the second lens group is configured to form a light emitting surface of the camera lens;
   mounting the second lens group into the lens barrel, wherein an angled edge of the lens barrel is disposed at a first end of the lens barrel away from the light incidence surface to directly support the second lens group, such that a volume of a second end of the lens barrel close to the light incidence surface is reduced; and
   mounting the first lens group into the lens barrel to obtain the camera lens,
   wherein the first lens group comprises a first lens configured to form the light incidence surface of the camera lens and at least one second lens, and the first lens and at least a part of the second lens are protruded from an end surface of the lens barrel to reduce a volume of the lens barrel.

2. The method according to claim 1, further comprising:
   obtaining the first lens group by connecting the first lens with the at least one second lens.

3. The method according to claim 1, wherein the second lens group comprises at least one lens.

4. The method according to claim 1, wherein the second lens group comprises at least one third lens and a fourth lens for forming the light emitting surface of the camera lens, and the at least one third lens is located between the fourth lens and the first lens group; and
   mounting the second lens group into the lens barrel comprises:
   mounting the fourth lens into the lens barrel; and
   sequentially mounting the at least one third lens into the lens barrel.

5. The method according to claim 1, further comprising:
   packaging at least one lens in the first lens group with the lens barrel.

6. The method according to claim 1, further comprising:
   performing light extinction treatment for at least one lens in the first lens group or the second lens group.

7. The method according to claim 6, wherein the performing light extinction treatment for the at least one lens comprises:
   forming a light shielding layer by coating non-transparent material on the at least one lens.

8. A camera lens, comprising:
   a lens barrel;
   a first lens group configured to form a light incidence surface of the camera lens and comprising a plurality of interconnected lenses, wherein the first lens group comprises a first lens configured to form the light incidence surface of the camera lens and at least one second lens, and the first lens and at least a part of the second lens are protruded from an end surface of the lens barrel to reduce a volume of the lens barrel; and
   a second lens group configured to form a light emitting surface of the camera lens, wherein an angled edge of the lens barrel is disposed at a first end of the lens barrel away from the light incidence surface to directly support the second lens group, such that a volume of a second end of the lens barrel close to the light incidence surface is reduced.

9. The camera lens according to claim 8, wherein the first lens is held by the second lens.

10. The camera lens according to claim 8, wherein the second lens group comprises at least one third lens and a fourth lens configured to form the light emitting surface of the camera lens, and the at least one third lens is located between the fourth lens and the first lens group.

11. The camera lens according to claim 8, wherein at least one lens in the first lens group is packaged with the lens barrel.

12. The camera lens according to claim 8, wherein a diameter of the first end of the lens barrel is less than a diameter of the second end of the lens barrel.

13. The camera lens according to claim 8, further comprising:
   a light shielding layer on at least one lens in the first lens group and/or the second lens group.

14. An electronic device, comprising:
   a screen assembly; and
   a camera assembly that comprises a camera lens comprising:
   a lens barrel;
   a first lens group configured to form a light incidence surface of the camera lens and comprising a plurality of interconnected lenses, wherein the first lens group comprises a first lens configured to form the light incidence surface of the camera lens and at least one second lens, and the first lens and at least a part of the second lens are protruded from an end surface of the lens barrel to reduce a volume of the lens barrel; and a second lens group configured to form a light emitting surface of the camera lens, wherein an angled edge of the lens barrel is disposed at a first end of the lens barrel away from the light incidence surface to directly support the second lens group, such that a volume of a second end of the lens barrel close to the light incidence surface is reduced.

15. The electronic device according to claim 14, wherein the second lens group comprises at least one third lens and a fourth lens configured to form the light emitting surface of the camera lens, and the at least one third lens is located between the fourth lens and the first lens group; and wherein at least one lens in the first lens group is packaged with the lens barrel.

16. The electronic device according to claim 15, wherein the screen assembly comprises an opening to accommodate a part of the first lens group protruded from an end surface of the lens barrel.

17. The electronic device according to claim 16, wherein the screen assembly comprises:

a display panel; and a front panel above the display panel;

wherein the opening is configured in the display panel.

* * * * *